(12) United States Patent
Gao et al.

(10) Patent No.: US 9,839,012 B2
(45) Date of Patent: Dec. 5, 2017

(54) CONFIGURATION METHOD AND DEVICE FOR TRANSMITTING UPLINK CONTROL INFORMATION (UCI)

(75) Inventors: Xuejuan Gao, Beijing (CN); Zukang Shen, Beijing (CN); Yanan Lin, Beijing (CN); Xueming Pan, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 228 days.

(21) Appl. No.: 13/704,232

(22) PCT Filed: May 13, 2011

(86) PCT No.: PCT/CN2011/074050
§ 371 (c)(1),
(2), (4) Date: Mar. 7, 2013

(87) PCT Pub. No.: WO2011/147263
PCT Pub. Date: Dec. 1, 2011

(65) Prior Publication Data
US 2013/0176957 A1    Jul. 11, 2013

(30) Foreign Application Priority Data
May 24, 2010   (CN) .......................... 2010 1 0189258

(51) Int. Cl.
*H04W 72/04*   (2009.01)
*H04L 5/00*    (2006.01)
*H04W 72/02*   (2009.01)

(52) U.S. Cl.
CPC ....... *H04W 72/0413* (2013.01); *H04L 5/0007* (2013.01); *H04L 5/0053* (2013.01); *H04W 72/02* (2013.01)

(58) Field of Classification Search
None
See application file for complete search history.

(56) References Cited

U.S. PATENT DOCUMENTS

| 2010/0098012 A1 | 4/2010 | Bala et al. |
| 2010/0195575 A1* | 8/2010 | Papasakellariou et al. .. 370/328 |
| 2010/0271970 A1 | 10/2010 | Pan et al. |

(Continued)

FOREIGN PATENT DOCUMENTS

| CN | 101409894 | 4/2009 |
| JP | 2010-74754 | 4/2010 |
| WO | 2010/048142 | 4/2010 |

OTHER PUBLICATIONS

ISR for related PCT/CN2011/074050 dated Jul. 28, 2011.
(Continued)

*Primary Examiner* — Donald Mills
(74) *Attorney, Agent, or Firm* — Ladas & Parry, LLP

(57) ABSTRACT

The present invention discloses a method and equipment for UCI transmission. Upon application of the technical solution provided in embodiments of the present invention, UE transmitting UCI through a selected PUSCH is realized when multiple PUSCH transmissions are available for a UE in one uplink subframe in LTE-A carrier aggregation system, which solves the problem on how to transmit UCI only through one PUSCH when multiple PUSCH transmissions are available.

14 Claims, 3 Drawing Sheets eNB selects an uplink component carrier from ULCCthe uplink component carrier set of said terminal unituser equipment according to the predeterminedpredefined selection rules or the current configuration and present scheduling information of terminal unitthe user equipment — S401 eNB receives UCI transmitted by terminal unitthe user equipment through the PUSCH on the selected uplink component carrier — S402

(56) References Cited

U.S. PATENT DOCUMENTS

| | | | |
|---|---|---|---|
| 2011/0274043 A1* | 11/2011 | Nam et al. | 370/328 |
| 2012/0113831 A1* | 5/2012 | Pelletier et al. | 370/252 |
| 2013/0039321 A1* | 2/2013 | Kim et al. | 370/329 |
| 2013/0230004 A1* | 9/2013 | Nam et al. | 370/329 |
| 2014/0177572 A1* | 6/2014 | Papasakellariou et al. | 370/329 |

OTHER PUBLICATIONS

WO for PCT/CN2011/074050 completed on Jul. 21, 2011.

3GPP TSG RAN WG1 Meeting #61bis, "UCI Transmission in the Presence of UL-SCH", Research in Motion, UK Limited, Agenda Item: 6.2.7, R1-104055, Jun. 28-Jul. 2010.

3GPP TSG RAN WG1 Meeting #61, "UCI Transmission in the Presence of UL-SCH", Research in Motion, UK Limited, Montreal, Canada, Agenda Item: 6.2.4.3, R1-103067, May 10-14, 2010.

Office Action for related CN Appln No. 2010101892582 dated Jan. 14, 2013 and its English translation.

Office Action for related JP Appln No. 2013-511517 dated Dec. 17, 2013 and its English translation.

Office Action for related KR Appln No. 10-2012-7023359 dated Mar. 13, 2014 and its English translation.

Rejection for related KR Appin No. 10-2012-7023359 dated Nov. 13, 2014 and its English translation.

Research in Motion et al: "UCI Transrnission in the Presence of UL-SCH Data", 3GPP Draft; R1-103067(RIM-UCI With UL Data), 3rd Generation Partnership Project (3GPP), Mobile Competence Centre; 650, Route Des Lucioles; F-06921 Sophia-Antipolis Cedex; France, vol. RAN WG1, No. Montreal , Canada; May 10, 2010-May 14, 2010, May 4, 2010 (May 4, 2010), XP050598338 pp. 1-2.

LG Electronics: UL CC selection for UCI transmission on PUSCH, 3GPP Draft: R1-104764_UL CC Selection_LGE, 3rd Generation Partnership Project (3GPP), Mobile Competence Centre; 650, Route Des Lucioles F-06921 Sophia-Antipolis Cedex; France, vol. RAN WG1, No. Madrid, Spain; Aug. 23, 2010, Aug. 18, 2010 (Aug. 18, 2010), XP050450143 pp. 1-5.

Research in Motion et al: "UCI Transmission in the Presence of Data" , 3GPP Draft; R1-104055 (RIM-UCI With UL Data) , 3rd Generation Partnership Project (3GPP), Mobile Competence Centre; 650, Route Des Lucioles F-06921 Sophia-Anti Polis Cedex; France, vol. RAN WG1, No. Dresden , Germany; Jun. 28, 2010-Jul. 2, 2010, Jun. 22, 2010 (Jun. 22, 2010), XP050598493.

NTT DOCOMO: "Clarification of UCI Transmission Scheme with Simultaneous Data Transmission", 3GPP Draft; R1-101210 UCI Transmission With Pusch, 3rd Generation Partnership Project (3GPP), Mobile Competence Centre; 650, Route Des Lucioles F-06921 Sophia-Antipolis Cedex; France, vol. RAN WG1, No. San Francisco, USA; Feb. 22, 2010-Feb. 26, 2010, Feb. 16, 2010 (Feb. 16, 2010) XP050598060, pp. 1-3.

LG Electronics: "UCI piggyback onto PUSCH for carrier aggregation", 3GPP Draft; R1-102692 LTEA_UCI Piggyback, 3rd Generation Partnership-Project (3GPP), Mobile Competence Centre ; 650, Route Des Lucioles F-06921 Sophia-Antipolis Cedex; France, vol. RAN WG1, No. Montreal , Canada; May 10, 2010, May 4, 2010 (May 4, 2010), XP050419899. Pages.

Extended European Search Report with EPO Supplementary European Search Report for EP11786035.3 dated Jul. 8, 2016.

* cited by examiner

CONFIGURATION METHOD AND DEVICE FOR TRANSMITTING UPLINK CONTROL INFORMATION (UCI)

CROSS REFERENCE TO RELATED APPLICATIONS

This application is the U.S. national stage of international patent application PCT/CN2011/074050 filed on May 13, 2011, which claims priority to Chinese patent application no. 201010189258.2 entitled "Method and Equipment for UCI Transmission" filed in the patent office of the People's Republic of China on May 24, 2010, the disclosures of which are incorporated by reference herein in their entireties.

FIELD OF THE INVENTION

The present invention relates to the field of communication technology, in particular to a method and equipment for UCI transmission.

BACKGROUND OF THE INVENTION

To support a system bandwidth wider than LTE (Long Term Evolution) system, such as 100 MHz, one possibility is to directly distribute spectrum with bandwidth of 100 MHz for LTE-A (Long Term Evolution Advanced) system as shown in FIG. 1 and the other is the CA (Carrier Aggregation) technology, viz. aggregate some spectrums distributed to present system to form a larger bandwidth for LTE multi-carrier system; at this moment, uplink and downlink carriers in system can be configured asymmetrically, viz. a UE (User Equipment) may occupy number of N≥1 carriers for downlink transmission, and number of M≥1 carriers for uplink transmission, as shown in FIG. 2.

UCI (Uplink Control Information) comprises CQI (Channel Quality Indicator)/PMI (Precoding Matrix Indicator)/RI (Rank Indicator), ACK (Acknowledgement)/NACK (Negative Acknowledgement) and SR (scheduling request) information. In LTE Rel-8 (Release 8) system, UCI can be transmitted either on PUCCH (Physical Uplink Control Channel) or on PUSCH (Physical Uplink Shared Channel) by multiplexing with the data on PUSCH. Aperiodic CQI/PMI/RI information is transmitted only on PUSCH, which is triggered by 1 bit CQI request information in the UL grant (Uplink grant). If the 1 bit CQI request information with a value of "1" in the UL grant is detected, the UE shall generate the related aperiodic CQI/PMI/RI information according to the pre-configured feedback mode and transmit the corresponding aperiodic CQI/PMI/RI on PUSCH with multiplexing; otherwise, the UE will not transmitt the aperiodic CQI/PMI/RI information. Periodic CQI/PMI/RI information is transmitted on PUCCH according to the pre-configured reporting cycle if there is no PUSCH transmission in current subframe. ACK/NACK and/or SR information are also transmitted on PUCCH if there is no PUSCH transmission in current subframe. In case there is a PUSCH transmission in current subframe, all UCI (including CQI/PMFRI/ACK/NACK/SR if exist) shall be transmitted on the PUSCH with multiplexing.

Compatible with the LTE system, LTE-A system supports the transmission of UCI on PUCCH and/or PUSCH. At present, it has been agreed that LTE-A system can support 5 carriers at most for aggregation, viz. a UE may be scheduled with multiple PUSCH transmissions in one uplink subframe. In addition, it has been agreed that UCI can only be transmitted on one PUSCH in one uplink subframe in LTE-A system. Therefore, when UCI is transmitted through PUSCH while there are multiple PUSCH is scheduled for the UE in the same uplink subframe, it is necessary to determine which PUSCH is adopted for transmitting UCI.

During the implementation of the embodiments of the present invention, the applicant finds that the following problems at least exist in the available technology:

In LTE-A carrier aggregation system, multiple PUSCH transmissions may be available for a UE in one uplink subframe. When the UE intends to transmit UCI through PUSCH, there is still no specific solution on how to determine which PUSCH is adopted to transmit UCI.

SUMMARY OF THE INVENTION

The embodiments of the present invention put forward a method and equipment for UCI transmission to solve the problem through which PUSCH the UCI is transmitted under multiple PUSCH scene.

To achieve the purpose aforesaid, the embodiments of the present invention provide a method for UCI transmission, including:

User equipment selects an uplink component carrier from its own uplink component carrier set according to the predefined selection rules or the received carrier selection indication information sent by eNB;

Said user equipment transmits UCI to said eNB through the PUSCH on the said selected uplink component carrier.

Besides, the embodiments of the present invention also provide a user equipment, including:

Selection module, which is used to select an uplink component carrier from the uplink component carrier set of the said user equipment according to the predefined selection rules or the received carrier selection indication information sent by eNB;

Transmission module, which is used to transmit UCI to said eNB through the PUSCH on the uplink component carrier selected by said selection module.

Besides, the embodiments of the present invention also provide a method for UCI transmission, including:

eNB selects an uplink component carrier from the uplink component carrier set of the user equipment according to the predefined selection rules or the current configuration and scheduling information of the said user equipment;

Said eNB receives UCI transmitted by said user equipment through the PUSCH on the said selected uplink component carrier.

Besides, the embodiments of the present invention also provide an eNB, including: Selection module, which is used to select an uplink component carrier from the uplink component carrier set of the user equipment according to the predefined selection rules or the current configuration and scheduling information of the user equipment;

Reception module, which is used to receive UCI transmitted by said user equipment through the PUSCH on the said selected uplink component carrier.

Compared with available technology, the embodiments of the present invention have the following advantages:

The application of the technical solution of the embodiments of the present invention can realize the solution that a UE transmits UCI through a selected PUSCH when multiple PUSCH transmissions are available for the UE in one uplink subframe in LTE-A carrier aggregation system, and resolve the problem on how a UE transmits UCI only through one PUSCH when multiple PUSCH are available in one uplink subframe in LTE-A system.

BRIEF DESCRIPTION OF THE DRAWINGS

To further explain the technical solution of the embodiments of the present invention or available technology, the attached drawings required by the embodiments or the exiting technical description will be briefly introduced below. Obviously, the following described drawings only refer to some embodiments of the present invention. Common technical personnel of the field can obtain other drawings as well according to these drawings without contributing creative work.

DETAILED DESCRIPTION OF PREFERRED EMBODIMENTS

The technical solution of the embodiments of the present invention will be described clearly and completely in combination with the drawings attached in the embodiments. Apparently, the described embodiments are only a part rather than the whole of the embodiments of the present invention. Other embodiments based on the embodiments of the present invention obtained by common technical personnel of the field without contributing creative work shall be protected by the present invention.

As shown in background technology, in LTE-A system, UE can work on multiple aggregated uplink component carriers at the same time. Multiple PUSCH transmissions may be available on several uplink component carriers in an uplink subframe. To be compatible with LTE system, LTE-A system supports to transmit UCI in PUSCH and it has been agreed that UCI can only be transmitted on one PUSCH in the same uplink subframe. When a UE is required to transmit UCI through PUSCH and when more than one PUSCH transmissions are available in current uplink subframe, there is still no specific solution on how to determine through which PUSCH UCI shall be transmitted.

The embodiments of the present invention put forward a method configuring UCI for transmission through PUSCH.

Figure 1:
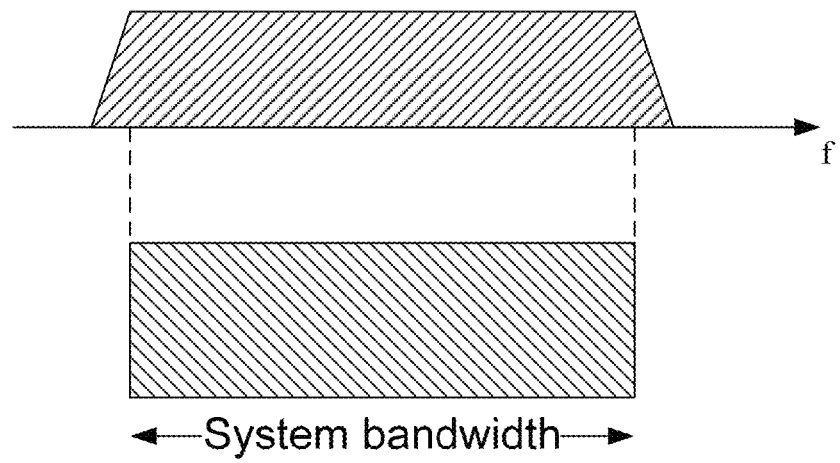
FIG. 1 is a system diagram of single spectrum system in available technology.
Figure 2:
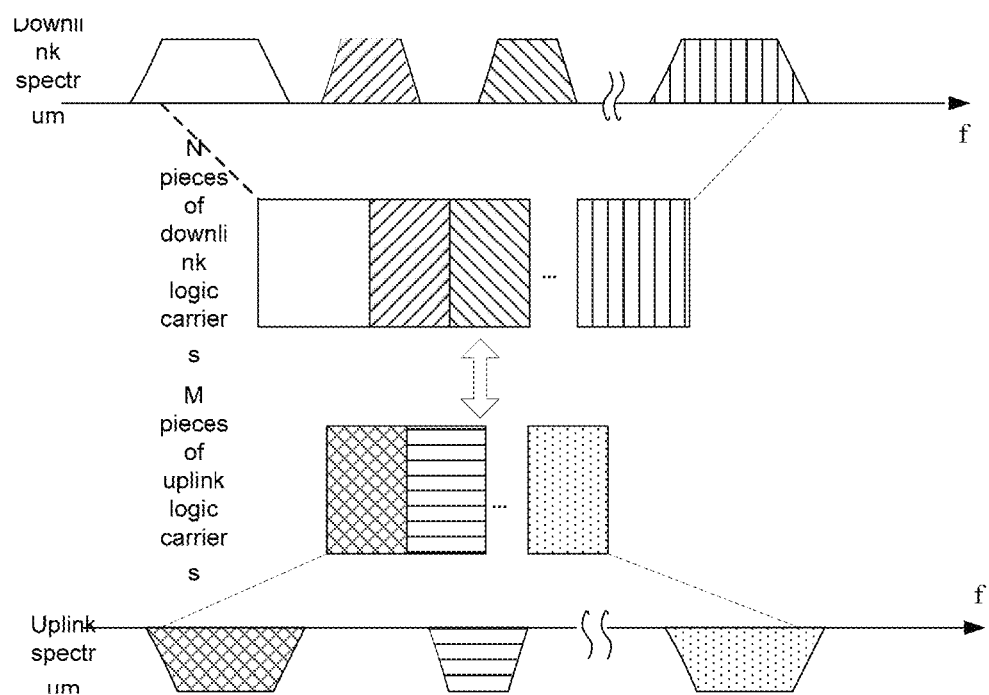
FIG. 2 is a system diagram of spectrum aggregation system in available technology.
Figure 3:
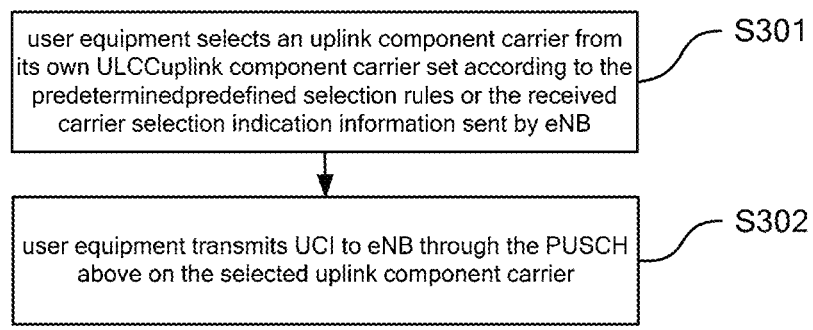
FIG. 3 is a flow diagram of the method for UCI transmission provided in the embodiments of the present invention.

As shown in FIG. 3, is a flow diagram of the method for UCI transmission provided in embodiments of the present invention, which comprises the following steps:

Step S301, user equipment selects an uplink component carrier from its own uplink component carrier set according to the predefined selection rules or the received carrier selection indication information sent by eNB.

The implementation of this step can be divided into three conditions with explanation as follows:

Condition I, user equipment selects an uplink component carrier from its own uplink component carrier set based on the selection rules if the selection rules are predefined by the eNB and the user equipment.

Conditions II, the user equipment selects an uplink component carrier from its own uplink component carrier set according to the carrier selection indication information, which is carried in the received high layer signalling sent by eNB.

Condition III, the user equipment selects an uplink component carrier from its own uplink component carrier set according to the carrier selection indication information, which is carried in the received PDCCH signalling.

In the said three conditions, selection of a corresponding uplink component carrier comprises the following three kinds:

(1) The user equipment is indicated by said predefined selection rules to select its uplink primary carrier preferentially.

(2) The user equipment is indicated by said predefined selection rules to select its uplink primary carrier preferentially when a PUSCH is available for the said user equipment on its uplink primary component carrier.

Preferably, the predefined selection rules can allow user equipment to select an uplink secondary component carrier among the uplink secondary component carriers with a available PUSCH based on component carrier index (CC index for short) when a PUSCH is unavailable on the uplink primary component carrier of the user equipment. For example, it is allowed to select the uplink secondary component carrier with the minimal CC index.

It should be explained that any signalling notice is unnecessary for the mode in (1) and (2) aforesaid.

(3) The user equipment is indicated by the said carrier selection indication information received through high layer signalling or PDCCH signalling to select its uplink primary component carrier preferentially.

Selection for application can be done according to specific configuration in actual implementation site, and such change will not affect protection range of the present invention.

Step S302, user equipment transmits UCI to eNB through the PUSCH on the selected uplink component carrier.

If a PUSCH (including a PUSCH corresponding to a PDCCH and a semi-persistent scheduling (SPS for short) PUSCH which does not corresponds to a PDCCH) is available for the said user equipment on the selected uplink component carrier in current uplink subframe, user equipment transmits UCI to eNB through the PUSCH on the selected uplink component carrier; and if at least ione PUSCH is available for the said user equipment at the same time on its other uplink component carrier(s), said user equipment only transmits uplink data through the PUSCH on the said other uplink component carrier(s); or, If a PUSCH (including un-receiving PUSCH scheduling indication, i.e. the UL grant or losing PUSCH scheduling indication) is unavailable for the said user equipment on the selected uplink component carrier in current uplink subframe, user equipment transmits UCI to eNB through the PUCCH on its uplink primary component carrier.

And if at least one PUSCH is available for the said user equipment at the same time on its other uplink component carrier(s), said user equipment only transmits uplink data through the PUSCH on the said other uplink component carrier(s).

Figure 4:
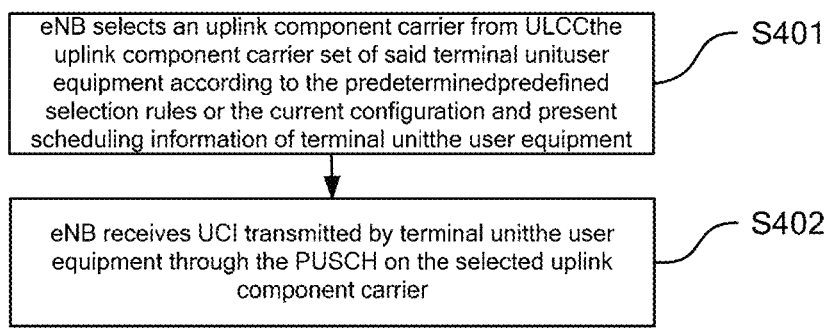
FIG. 4 is a flow diagram of the method for UCI transmission at the eNB side provided in the embodiments of the present invention.

The process aforesaid is an application flow of the method at side of the user equipment for UCI transmission provided in embodiments of the preset invention. Correspondingly, embodiments of the present invention further describe the corresponding treatment process at eNB side in this technical solution as below:

As shown in FIG. 4, is a flow diagram of the method for UCI transmission at network side provided in embodiments of the present invention, which comprises the following steps:

Step S401, eNB selects an uplink component carrier from the uplink component carrier set of said user equipment according to the predefined selection rules or the current configuration and scheduling information of the user equipment.

The implementation of this step is divided into three conditions with explanation as follows:

Condition I, eNB selects an uplink component carrier from the uplink component carrier set of the user equipment according to the predefined selection rules if the selection rules are predefined by eNB and user equipment.

Condition II, eNB selects an uplink component carrier from the uplink component carrier set of the user equipment according to the current configuration and scheduling information of the user equipment and sends carrier selection indication information to the user equipment through high layer signalling to inform the user equipment of the selection results.

Condition III, eNB selects an uplink component carrier from the uplink component carrier set of the user equipment according to the current configuration and scheduling information of the user equipment and sends carrier selection indication information to the user equipment through PDCCH to inform the user equipment of the selection results.

In said three conditions, selection of a corresponding uplink component carrier comprises the following three kinds:

(1) The eNB is indicated by said predefined selection rules to select the uplink primary component carrier of the user equipment preferentially.

(2) The eNB is indicated by said predefined selection rules to select the uplink primary component carrier of the user equipment preferentially when eNB schedules a PUSCH transmission for the user equipment on the uplink primary carrier of the user equipment.

Preferably, the predefined selection rules can allow eNB to select an uplink secondary component carrier among uplink secondary component carriers each with a scheduled PUSCH transmission for the user equipment based on the CC index. when eNB doesn't schedule a PUSCH transmission on the uplink primary component carrier of the user equipment. For example, it is allowed to select the uplink secondary component carrier with the minimal CC index among those uplink secondary component carriers with PUSCH transmission.

(3) eNB selects preferentially an uplink component carrier from the uplink component carrier set of the user equipment according to the current configuration and scheduling information of the user equipment.

Selection for application can be done according to specific configuration in actual implementation site, and such change will not affect protection range of the present invention.

Step S402, eNB receives UCI transmitted by the user equipment through the PUSCH on the selected uplink component carrier.

If a PUSCH transmission (including PUSCH corresponding to a PDCCH and SPS PUSCH not corresponding to a PDCCH) is scheduled by eNB for the user equipment on the selected uplink component carrier in current uplink subframe, eNB receives UCI transmitted by the user equipment through the PUSCH on the selected uplink component carrier and only receives uplink data information through the PUSCH on other uplink component carrier(s) if eNB schedules at least one PUSCH transmission at the same time on other uplink component carrier(s) of the user equipment; or, If a PUSCH transmission is not scheduled by eNB for the user equipment on the selected uplink component carrier in current uplink subframe, eNB receives UCI transmitted by the user equipment through the PUCCH on the uplink primary component carrier of the user equipment and only receives uplink data information through the PUSCH on other uplink component carrier(s) if eNB schedules at least one PUSCH transmission on other uplink component carrier(s) of the user equipment.

Compared with available technology, the embodiments of the present invention have the following advantages:

The application of the technical solution of the embodiments of the present invention can realize the solution that UE transmits UCI through a selected PUSCH when multiple PUSCH are available for a UE in one uplink subframe in LTE-A carrier aggregation system, and resolve the problem on how a UE transmits UCI only through one PUSCH when multiple PUSCH are transmitted on in current uplink subframe in LTE-A system.

The technical solution put forward by the embodiments of the present invention will be explained in combination with actual implementation site.

It is obvious from the description aforesaid that in LTE-A carrier aggregation system, multiple PUSCH may be available for a UE on several uplink component carriers. When UE transmits UCI in PUSCH, it is required to determine the a specific PUSCH to transmit UCI. Corresponding to said three conditions, PUSCH can be determined by ways including:

Method I, eNB and UE are predefined to use the PUSCH scheduled on one special uplink component carrier (UL CC for short) in the uplink component carrier set (UL CC set for short) of the UE to transmit UCI and additional signalling notice is unnecessary. Herein, the PUSCH scheduled on the uplink primary component carrier (UL PCC for short) is preferentially selected to be used for transmitting UCI. When a PUSCH is unavailable for a UE on its uplink primary component carrier, eNB and UE are allowed to determine in advance to select one uplink secondary component carrier (UL SCC for short) among the uplink secondary component carrier with PUSCH transmission according to the CC index. For example, the PUSCH on the uplink secondary carrier with PUSCH transmission and with the minimal CC index is preferentially determined to be used for transmitting UCI.

Method II, eNB determines to use a PUSCH scheduled on an uplink component carrier in the UL CC set of the UE to transmit UCI according to UE configuration and actual scheduling, and then, informs the UE through high layer signalling semi-statistically. Herein, it is preferentially to configure the PUSCH scheduled on the uplink primary carrier of the UE to transmit UCI.

Method III, eNB determines to use a PUSCH scheduled on an uplink component carrier in the UL CC set of the UE to transmit UCI according to UE configuration and actual scheduling, and then, informs the UE through PDCCH dynamically. Herein, if a PUSCH is available for the UE on the uplink primary carrier of the UE, it is preferentially to configure the PUSCH scheduled on the uplink primary carrier of the UE to transmit UCI.

Accordingly, after processing all informing processes aforesaid, embodiments of the present invention describe the detailed UCI transmission process as below in accordance with whether the selected uplink component carrier is the uplink primary component carrier and whether a PUSCH is available on the uplink component carrier in current subframe:

Condition I, if a UE has been configured or predefined to use the PUSCH on the uplink primary component carrier to transmit UCI and a PUSCH is available for the UE on the uplink primary component carrier in current uplink subframe, UE transmits UCI through the PUSCH on the uplink primary component carrier. At that time, if at least one PUSCH is available for the UE at the same time on the other uplink component carrier(s) of the UE, the PUSCH(s) on those corresponding uplink component carrier(s) only carries uplink data.

Condition II, if a UE has been configured or predefined to use the PUSCH on the uplink primary component carrier to transmit UCI and a PUSCH is unavailable for the UE on the uplink primary component carrier in current uplink subframe, UE transmits UCI through the PUCCH on the uplink primary component carrier. At that time, if at least one PUSCH is available for the UE at the same time on the other uplink component carrier(s) of the UE, the PUSCH(s) on those corresponding uplink component carrier(s) only carries uplink data.

Condition III, if a UE has been configured or predefined to use the PUSCH on the uplink primary component carrier to transmit UCI when a PUSCH is available for the UE on the uplink primary component carrier, the UE transmits UCI through the PUSCH on a uplink secondary component carrier and the minimal CC index when a PUSCH is unavailable for the UE on the uplink primary component carrier of the UE in current uplink subframe. At that time, if at least one PUSCH is available for the UE at the same time on the other uplink component carrier(s) of the UE, the PUSCH(s) on those corresponding uplink component carrier(s) only carries uplink data.

Condition IV, if a UE has been configured or predefined to use the PUSCH on an uplink component carrier except for the said uplink primary component carrier to transmit UCI, and there is a PUSCH for the UE on the corresponding uplink component carrier in current uplink subframe, UE transmits UCI through the PUSCH on the corresponding uplink component carrier. At that time, if at least one PUSCH is available for the UE at the same time on the other uplink component carrier(s) of the UE, the PUSCH on those corresponding uplink component carrier(s) only carries uplink data.

Condition V, if a UE has been configured or predefined to use the PUSCH on an uplink component carrier except for the said uplink primary component carrier to transmit UCI, and there is not a PUSCH for the UE on the corresponding uplink component carrier in current uplink subframe, UE transmits UCI through the PUCCH over the uplink primary component carrier of the UE. At that time, if at least one PUSCH is available for the UE on the other uplink component carrier(s) of the UE, the PUSCH(s) on those corresponding uplink component carriers only carries uplink data.

Compared with available technology, the embodiments of the present invention have the following advantages:

The application of the technical solution of the embodiments of the present invention can realize the solution that UE transmits UCI through a selected PUSCH when multiple PUSCH are available for a UE in one uplink subframe in LTE-A carrier aggregation system, and resolve the problem on how a UE transmits UCI only through one PUSCH when multiple PUSCH are transmitted in current uplink subframe in LTE-A system.

Figure 5:
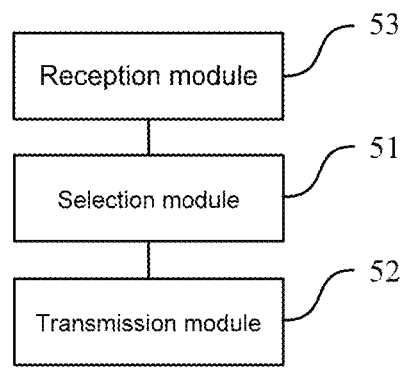
FIG. 5 is a structural diagram of the user equipment provided in the embodiments of the present invention.

To realize the technical solution provided in embodiments of the present invention, embodiments of the present invention also provide a user equipment, whose structural diagram is shown in FIG. 5, further including:

Selection module 51, which is used to select an uplink component carrier from the uplink component carrier set of the said user equipment according to the predefined selection rules or the received carrier selection indication information sent by eNB;

Transmission module 52, which is used to transmit UCI to said eNB through the PUSCH on the uplink component carrier selected by selection module 51 to eNB.

Further more, selection module 51 sselects an uplink component carrier from the uplink component carrier set of the said user equipment according to the said predefined selection rules if there are the said predefined selection rules predefined by the said eNB and the said user equipment.

Herein, the user equipment is preferentially determined by said predetermined selection rules to select said uplink primary carrier of said ULCC set; or, The predetermined selection rules shall agree preferentially that when PUSCH is available for transmission of user equipment above uplink primary component carrier, user equipment will select uplink primary component carrier in ULCC set.

Moreover, the user equipment comprises:

Reception module 53, which is used to receive the carrier selection indication information sent by said eNB through the high layer signalling or the PDCCH signalling.

Herein, Said reception module 53 is indicated by the said carrier selection indication information received by the said reception module through the said high layer signalling or PDCCH signalling to select the uplink primary component carrier of the said user equipment preferentially.

It must be further noted that transmission module 52 is specifically used for:

If a PUSCH is available for the said user equipment on the said selected uplink component carrier in current uplink subframe, said transmission module 52 transmits UCI to the said eNB through the PUSCH on the said selected uplink component carrier; and if at least one PUSCH is available for the said user equipment at the same time on other uplink component carrier(s) of the said user equipment, said transmission module 52 only transmits uplink data through the PUSCH on the said other uplink component carrier(s); or, If a PUSCH is unavailable for the said user equipment on the said selected uplink component carrier in current uplink subframe, said transmission module 52 transmits UCI to the said eNB through the PUCCH on the uplink primary component carrier of the said user equipment; and if at least one PUSCH is available for the said user equipment on other uplink component carrier(s) of the said user equipment, said transmission module 52 only transmits uplink data through the PUSCH on the said other uplink component carrier(s).

Figure 6:
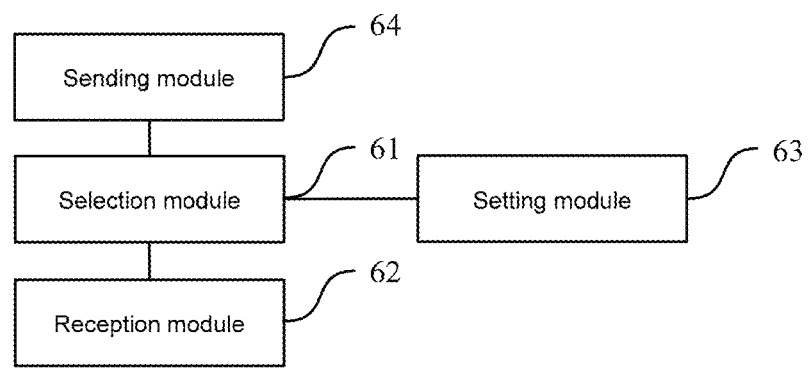
FIG. 6 is a structural diagram of the eNB in the embodiments of the present invention.

Besides, embodiments of the present invention also provide An eNB, whose structural diagram is shown in FIG. 6, further including:

Selection module 61, which is used to select an uplink component carrier from the uplink component carrier set of the user equipment according to the predefined selection rules or the current configuration and scheduling information of the user equipment;

Reception module 62, which is used to receive UCI transmitted by said user equipment through the PUSCH on the said selected uplink component carrier by selection module 61.

Further more, selection module 61 selects an uplink component carrier from the uplink component carrier set of the said user equipment according to the said predefined selection rules if there are the said predefined selection rules predefined by the said eNB and the said user equipment.

Herein, the eNB is preferentially determined by said predetermined selection rules to select said uplink primary carrier of said ULCC set; or, The predetermined selection rules shall agree preferentially that when PUSCH transmission is scheduled above uplink primary carrier of eNB on user equipment, eNB will select uplink primary component carrier in ULCC set.

Moreover, the eNB comprises:

Sending module 63, which is used to send carrier selection indication information to user equipment through high layer signalling or PDCCH signalling after the said selection module 61 selects an uplink component carrier from the uplink component carrier set of the said user equipment according to the current configuration and scheduling information of the said user equipment, so as to inform the selected uplink component carrier to the said user equipment.

Herein, the selection module 61 preferentially selects the uplink primary component carrier of the said user equipment according to the current configuration and scheduling information of the said user equipment, and then said sending module sends the carrier selection indication information to the said user equipment through high layer signalling or PDCCH signalling to inform the selected uplink component carrier to the said user equipment.

It needs be further noted that reception module 62 is specifically used for:

If a PUSCH transmission is scheduled by the said eNB for the said user equipment on the said selected uplink component carrier in current uplink subframe, said reception module 62 receives UCI transmitted by the said user equipment through the PUSCH on the said selected uplink component carrier and only receives uplink data through the PUSCH on other uplink component carrier(s) if at least one PUSCH transmission is scheduled by the said eNB for the said user equipment at the same time on the said other uplink component carrier(s); or, If a PUSCH transmission is not scheduled by the said eNB for the said user equipment on the said selected uplink component carrier in current uplink subframe, said reception module 62 receives UCI transmitted by the said user equipment through the PUCCH on the uplink primary component carrier of the said user equipment and only receives uplink data through the PUSCH on other uplink component carrier(s) if at least one PUSCH transmission is scheduled by the said eNB for the said user equipment on the said other uplink component carrier(s).

Compared with available technology, the embodiments of the present invention have the following advantages:

The application of the technical solution of the embodiments of the present invention can realize the solution that UE transmits UCI through a PUSCH when multiple PUSCH are scheduled and transmitted on an uplink subframe in LTE-A carrier aggregation system, and resolve the problem how UE transmits UCI only through a PUSCH when multiple PUSCH are transmitted on an uplink subframe in LTE-A system.

Through description of the above embodiments, technical personnel of the field can clearly understand that the present invention is realized depending on software and necessary general hardware platform, and also can be realized through hardware, while the former is better in many cases. Based on this understanding, the technical solution of the present invention or the part making contributions to available technology can be essentially reflected by means of software product. This computer software product is stored in a storage medium, including several instructions to enable a computer unit (such as personal computer, sever, or network equipment, etc.) to implement the methods described in all embodiments of the present invention.

Technical personnel of the field can understand that the drawings only refer to the diagram of a preferred embodiment, and the module or procedure is not necessary for the implementation of the embodiments of the present invention.

Technical personnel of the field can understand that the module of the unit of an embodiment can be distributed in such unit according to embodiment description, or located in one or more units of another embodiment through corresponding changes.

Modules of the embodiments mentioned above can be merged into one module, or further divided into multiple submodules.

The number of the aforementioned embodiments of the present invention is only used for description rather than for representing advantages or disadvantages.

Only several specific embodiments of the present invention are released above. However, the present invention is not only comprised of those. Any change that technical personnel of the field can predict shall be protected by the present invention.

The invention claimed is:

1. A method for Uplink Control Information (UCI) transmission, comprising:

selecting, by a user equipment, an uplink component carrier out of its own uplink component carrier set according to a predefined selection rule(s) or received carrier selection indication information sent by an evolved Node B (eNB); and transmitting, by the user equipment, the UCI to the eNB through a Physical Uplink Shared Channel (PUSCH) or PUSCHs on the selected uplink component carrier, wherein the user equipment selects the uplink primary component carrier out of its own uplink component carrier set according to the pre-defined selection rule(s) when at least one PUSCH is available for the user equipment on its uplink primary component carrier, and the user equipment selects one uplink secondary component carrier having the smallest number out of uplink component carrier having PUSCH transmission when no PUSCH is available for the user equipment on its uplink primary component carrier.

2. The method as claimed in claim 1, wherein the user equipment selecting the uplink component carrier out of its own uplink component carrier set according to the pre-defined selection rule(s) or the received carrier selection indication information sent by the eNB comprises:

selecting, by the user equipment, an uplink component carrier out of its own uplink component carrier set according to the selection rule(s) if there are the selection rule(s) predefined by the eNB and the user equipment; or, selecting, by the user equipment, an uplink component carrier out of its own uplink component carrier set according to the carrier selection indication information carried by received high layer signaling sent by the eNB; or, selecting, by the user equipment, an uplink component carrier out of its own uplink component carrier set according to the carrier selection indication information carried by received Physical Downlink Control Channel (PDCCH) signaling.

3. The method as claimed in claim 2, wherein:
the user equipment is indicated by the predefined selection rule(s) to select its uplink primary component carrier preferentially; or
the user equipment is indicated by the predefined selection rule(s) to select its uplink primary component carrier preferentially when a PUSCH is available for the user equipment on its uplink primary component carrier; or,
the user equipment is indicated by the carrier selection indication information carried by the high layer signaling or the PDCCH signaling to select its uplink primary component carrier preferentially.

4. The method as claimed in claim 1, wherein:
in the condition that at least one PUSCH is available for the user equipment on the selected uplink component carrier in a current uplink subframe and other PUSCH(s) is available for the user equipment at the same time on other uplink component carrier(s) of the user equipment, the user equipment transmits the UCI to the eNB through the at least one PUSCH on the selected uplink component carrier and only transmits uplink data through the other PUSCH(s) on the other uplink component carrier(s).

5. A user equipment, comprising:
a processor;
a memory, which is connected with the processor and stores program and data used when the processor executes; and
a transceiver, which communicates with other communication devices over a transmission medium,
wherein the user equipment realizes the following processing, when the program and data stored in the memory are called and executed by the processor:
selecting an uplink component carrier out of its own uplink component carrier set according to a pre-defined selection rule(s) or received carrier selection indication information sent by an evolved Node B (eNB); and
transmitting the UCI to the eNB through a Physical Uplink Shared Channel (PUSCH) or PUSCHs on the selected uplink component carrier,
wherein the user equipment selects the uplink primary component carrier out of its own uplink component carrier set according to the pre-defined selection rule(s) when at least one PUSCH is available for the user equipment on its uplink primary component carrier, and the user equipment selects one uplink secondary component carrier having the smallest number out of uplink component carrier having PUSCH transmission when no PUSCH is available for the user equipment on its uplink primary component carrier.

6. The user equipment as claimed in claim 5, wherein
the user equipment is configured to receive the carrier selection indication information carried by a high layer signaling or a Physical Downlink Control Channel (PDCCH) signaling sent by the eNB.

7. The user equipment as claimed in claim 6, wherein
the user equipment is indicated by the received carrier selection indication information carried by the high layer signaling or the PDCCH signaling to select the uplink primary component carrier by the user equipment preferentially.

8. The user equipment as claimed in claim 5, wherein
the user equipment is configured to select an uplink component carrier out of the uplink component carrier set of the user equipment according to the predefined selection rule(s) if there are the predefined selection rule(s) predefined by the eNB and the user equipment.

9. The user equipment as claimed in claim 8, wherein
the user equipment is indicated by the predefined selection rule(s) to select the uplink primary component carrier of the user equipment preferentially; or
the user equipment is indicated by the predefined selection rule(s) to select the uplink primary component carrier of the user equipment preferentially when a PUSCH is available for the user equipment on its uplink primary component carrier.

10. The user equipment as claimed in claim 5, wherein:
in the condition that at least one PUSCH is available for the user equipment on the selected uplink component carrier in a current uplink subframe and other PUSCH(s) is available for the user equipment at the same time on other uplink component carrier(s) of the user equipment, the user equipment transmits the UCI to the eNB through the at least one PUSCH on the selected uplink component carrier and only transmits uplink data through the other PUSCH(s) on the other uplink component carrier(s).

11. A method for Uplink Control Information (UCI) transmission, comprising:
selecting, by an evolved Node B (eNB), an uplink component carrier out of the uplink component carrier set of a user equipment according to a predefined selection rule(s) or current configuration and scheduling information of the user equipment; and
receiving, by the eNB, the UCI transmitted by the user equipment through a Physical Uplink Shared Channel (PUSCH) or PUSCHs on the selected uplink component carrier,
wherein the eNB selects the uplink primary component carrier out of uplink component carrier set of the user equipment according to the pre-defined selection rule(s) when at least one PUSCH is available for the user equipment on its uplink primary component carrier, and the eNB selects one uplink secondary component carrier having the smallest number out of uplink component carrier having PUSCH transmission when no PUSCH is available for the user equipment on its uplink primary component carrier.

12. The method as claimed in claim 11, wherein the eNB selecting the uplink component carrier out of the uplink component carrier set of the user equipment according to the predefined selection rule(s) or the current configuration and scheduling information of the user equipment comprises:
selecting, by the eNB, an uplink component carrier out of the uplink component carrier set of the user equipment according to the selection rule(s) if there are the selection rule(s) predefined by the eNB and the user equipment; or,
selecting, by the eNB, an uplink component carrier out of the uplink component carrier set of the user equipment according to the current configuration and scheduling information of the user equipment, and sending carrier selection indication information to the user equipment through a high layer signaling to inform a selection result; or,
selecting, by the eNB, an uplink component carrier out of the uplink component carrier set of the user equipment according to the current configuration and scheduling information of the user equipment, and sending carrier selection indication information to the user equipment through a Physical Downlink Control Channel (PDCCH) to inform a selection result.

13. The method as claimed in claim 12, wherein
the eNB is indicated by the predefined selection rule(s) to select the uplink primary component carrier of the user equipment preferentially; or,
the eNB is indicated by the predefined selection rule(s) to select the uplink primary component carrier of the user equipment preferentially when the eNB schedules a PUSCH transmission for the user equipment on the uplink primary component carrier of the user equipment; or,
the eNB preferentially selects the uplink primary component carrier of the user equipment according to the current configuration and scheduling information of the user equipment, and then sends the carrier selection indication information to the user equipment through the high layer signaling or the PDCCH signaling to inform the selection result.

14. The method as claimed in claim 11, wherein:
if at least one PUSCH transmission is scheduled by the eNB for the user equipment on the selected uplink component carrier in a current uplink sub-frame and other PUSCH(s) is available for the user equipment at the same time on other uplink component carrier(s) of the user equipment, the eNB receives the UCI transmitted by the user equipment through the at least one PUSCH on the selected uplink component carrier, and the eNB only receives uplink data through the other PUSCH(s) on other uplink component carrier(s) of the user equipment.

* * * * *